(12) United States Patent
Grabli et al.

(10) Patent No.: US 7,746,344 B2
(45) Date of Patent: Jun. 29, 2010

(54) IDENTIFICATION OF OCCLUSIONS IN STROKE-BASED RENDERING

(75) Inventors: Stephane Grabli, Santa Monica, CA (US); Robert Kalnins, Santa Monica, CA (US); Amitabh Agrawal, Westchester, CA (US); Nathan LeZotte, Los Angeles, CA (US)

(73) Assignee: Auryn Inc., Los Angeles, CA (US)

( * ) Notice: Subject to any disclaimer, the term of this patent is extended or adjusted under 35 U.S.C. 154(b) by 574 days.

(21) Appl. No.: 11/668,449

(22) Filed: Jan. 29, 2007

(65) Prior Publication Data

US 2007/0176929 A1 Aug. 2, 2007

Related U.S. Application Data

(60) Provisional application No. 60/762,601, filed on Jan. 27, 2006.

(51) Int. Cl.
*G06T 15/00* (2006.01)

(52) U.S. Cl. ........................ 345/473; 345/557; 345/582; 345/653; 345/679; 715/861; 715/863

(58) Field of Classification Search ................. 345/419, 345/473, 557, 582, 653, 679; 715/861, 863
See application file for complete search history.

(56) References Cited

U.S. PATENT DOCUMENTS

| | | | |
|---|---|---|---|
| 5,619,626 A | 4/1997 | Huddy | |
| 5,847,712 A | 12/1998 | Salesin et al. | |
| 6,268,865 B1 | 7/2001 | Daniels et al. | |
| 6,326,972 B1 | 12/2001 | Buhler et al. | |
| 6,603,881 B2 * | 8/2003 | Perrone et al. | 382/186 |
| 6,870,550 B1 * | 3/2005 | Schuster et al. | 345/639 |
| 7,248,270 B1 * | 7/2007 | Boylan | 345/679 |
| 7,456,841 B2 * | 11/2008 | Wood et al. | 345/582 |
| 7,568,171 B2 * | 7/2009 | Boylan | 715/863 |
| 2002/0097909 A1 | 7/2002 | Perrone et al. | |
| 2005/0007372 A1 | 1/2005 | Ecob et al. | |

OTHER PUBLICATIONS

Meier, B. J., "Painterly Rendering for Animation," Proc. of Computer Graphics, 1996, pp. 477-484.
PCT International Search Report and Written Opinion, PCT/US07/61254, Mar. 21, 2008, 9 pages.

* cited by examiner

*Primary Examiner*—Phu Nguyen
(74) *Attorney, Agent, or Firm*—Fenwick & West LLP (57) ABSTRACT

A renderer for performing stroke-based rendering determines whether two given overlapping strokes depict an occlusion in a three-dimensional scene. The renderer may then use this information to determine whether to apply an occlusion constraint between the strokes when rendering an image or a frame from an animation. In one implementation, the renderer determines whether the two strokes together depict a single view patch of surface in the scene (i.e., a single portion of three-dimensional surface in the scene as seen from the rendering viewpoint). The renderer builds an image-space patch of surface defined from the union of the two overlapping strokes and then determines whether there exists a single three-dimensional view patch of surface that projects onto the image-space patch and that contains both strokes' three-dimensional anchor points. Which stroke occludes the other can be determined by the relative three-dimensional depth of the strokes' anchor points from the rendering viewpoint.

31 Claims, 4 Drawing Sheets

IDENTIFICATION OF OCCLUSIONS IN STROKE-BASED RENDERING

CROSS REFERENCE TO RELATED APPLICATIONS

This application claims the benefit of U.S. Provisional Application No. 60/762,601, filed Jan. 27, 2006, which is incorporated by reference in its entirety.

This application is also related to U.S. application Ser. No. 11/668,437, filed Jan. 29, 2007, which is incorporated by reference in its entirety.

BACKGROUND

This invention relates generally to stroke-based rendering, and in particular to verifying the occlusion of strokes in a still image or in a frame of a stroke-based animation.

Non-photorealistic rendering (NPR) is a subfield of computer graphics that offers additional variety in the looks afforded by computer generated animations. In this field, much time and effort have been spent researching algorithms to produce renderings that could imitate traditional media in a variety of artistic styles. Within non-photorealistic rendering, stroke-based rendering is a popular technique in which an image is created by the sequential drawing of atomic image-space discrete elements (the strokes). Painterly Rendering, for instance, is a well known example of stroke-based rendering where each stroke simulates a brush stroke and is rendered through, e.g., an oil painting media simulation. For example, impressionist paintings can be successfully imitated using this technique.

The input to stroke-based rendering can either be two-dimensional (e.g., an image or video) or three-dimensional (e.g., a three-dimensional model for an animated scene). In three-dimensional stroke-based rendering, the three-dimensional surfaces of the scene are rendered using image-space surface elements, or strokes. Each stroke is associated with a three-dimensional point on an object of the scene, which is the stroke's three-dimensional anchor point. The stroke thus depicts a portion of surface for the object to which the stroke belongs around that anchor point.

As opposed to photorealistic rendering, the drawing marks used for depiction in NPR stroke-based rendering (e.g., brush strokes) are typically individually distinguishable in the final result. Due to their extent in a particular image, or frame in an animation, the strokes can overlap. As a consequence, the order in which overlapping frames are drawn visually influences the resulting frame. For instance, if $V_p$ and $V_q$ are two overlapping strokes, drawing $V_p$ and then $V_q$ would produce a different image than drawing $V_q$ and then $V_p$.

The order in which some of the strokes should be drawn naturally arises from geometric constraints present in the scene, such as when two overlapping strokes $V_p$ and $V_q$ depict an occlusion in the scene. For example, when the patch of surface drawn by $V_p$ either partially or completely occludes the patch of surface drawn by $V_q$, then $V_q$ must be drawn before $V_p$ to reflect the occlusion properly in the resulting frame. It can be noted that in typical scenes, the constraints imposed by occlusion of surfaces only partially constrain the ordering of the strokes in a given frame.

Enforcing a particular ordering only where it is necessary provides a useful flexibility for the renderer. Indeed, wherever the order between two strokes is not predetermined by occlusion or some other user-defined constraints, some stroke orderings might provide more aesthetic results than other orderings. It is therefore desirable to be able to identify whether two overlapping strokes define an occlusion when rendering a still image or a frame in stroke-based animation.

Three-dimensional stroke-based rendering was first introduced by Barbara Meier in 1994 and is described in her paper, Barbara J. Meier, Painterly Rendering for Animation, Proc. of Computer Graphics, 1996, p. 477-484. In this system, three-dimensional particles are placed onto the objects of the scene, and each particle is associated with a stroke in two-dimensional image space whose visual attributes are queried from reference images at the point. To render occlusions properly, strokes are sorted according to the depth of their corresponding particles before being drawn in image space. Although such an ordering allows for a proper depiction of visibility, enforcing depth ordering for all strokes is not flexible enough for production quality stroke-based rendering.

Since Meier's paper, no further work has been done in stroke-based rendering to overcome these limitations. The field of point-based rendering, which became popular in the last few years, also uses image-space surface elements to render three-dimensional geometry using a technique known as splatting, which can be categorized as stroke-based rendering. As opposed to NPR stroke-based rendering, e.g. painterly rendering, however, splatting attempts to simulate continuous surface shading and uses filtering to prevent individual strokes to be distinguishable. As a result, simple visibility algorithms, such as depth ordering, are sufficient to produce the desired result. But these techniques used for splatting would generally not be flexible enough in stroke-based rendering where the strokes are individually visible.

Techniques are thus desired for characterizing occlusion by identifying whether overlapping strokes define an occlusion in the context of three-dimensional stroke-based rendering.

SUMMARY

Embodiments of the invention enable a renderer for stroke-based rendering to determine whether two or more overlapping strokes in a still frame or in a frame of an animation depict an occlusion. Using this information, the renderer may then determine whether to apply a constraint within a particular frame that the overlapping strokes must be drawn in a particular order—namely, that the occluding stroke be drawn over the occluded stroke—for a proper rendering of the frame.

Figure 1:
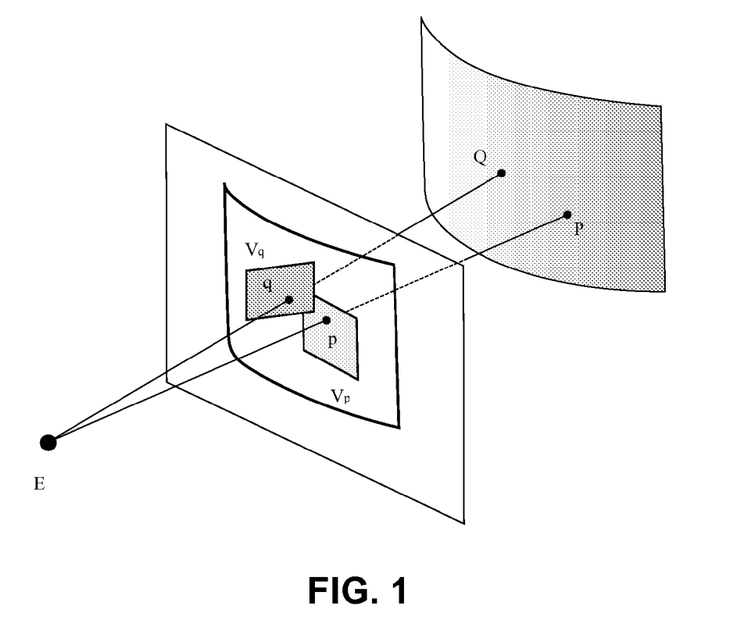
FIG. 1 illustrates an example situation in which two strokes depict a single surface view patch (i.e., a same portion of three-dimensional surface in the view) and therefore do not correspond to an occlusion in the scene.
Figure 2:
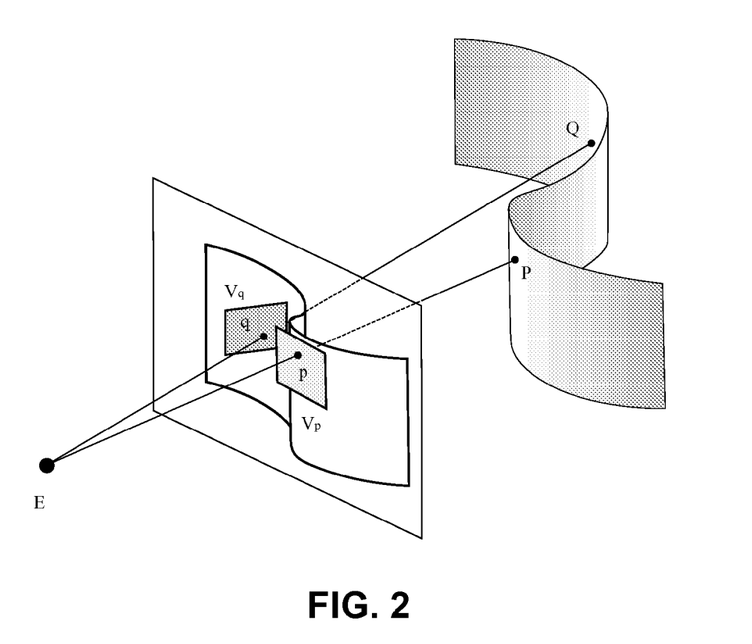
FIG. 2 illustrates an example situation in which two strokes do not depict a single surface view patch and therefore correspond to an occlusion in the scene.

In one embodiment, the renderer determines whether a given pair of overlapping strokes together depicts a single view patch of surface, i.e., a same portion of surface in the three-dimensional scene, as seen from the rendering viewpoint. (A view patch of surface is defined in more detail in the following detailed description.) If the strokes together depict a single view patch, they do not correspond to an occlusion in the scene. An example of this situation is illustrated in FIG. 1. In the opposite case, the strokes do depict an occlusion because they belong to different portions of surface in the scene that overlap in the view. An example of this situation is illustrated in FIG. 2. In this case, the stroke belonging to the portion of surface closer to the rendering viewpoint (Vp, in this example) should be drawn last for a proper depiction of the depth of the rendered surfaces in the animation.

In one implementation, the renderer attempts to determine whether two strokes together depict a single view patch by, first, building in image space the region $S_i$ defined by the union of the two strokes and, then, verifying whether there exists a single surface view patch $S_w$ in the three-dimensional scene, as seen from the rendering viewpoint, that both projects onto $S_i$ and contains the two strokes' three-dimensional anchor points. If such a surface view patch $S_w$ exists, the renderer determines that the strokes do not depict an occlusion in the scene. In that case, the order in which they are drawn may not be critical. In the opposite case, the renderer determines that the strokes do depict an occlusion, and the order in which they are drawn is more important—if not critical. Which stroke occludes the other can then be determined according to the relative three-dimensional depth of the strokes' three-dimensional anchor points from the rendering viewpoint.

In one embodiment, the technique for determining occlusion is beneficially generic, as it does not make any assumption on the pair of strokes that is considered as input. This allows the technique to work on a set of strokes corresponding to any, or all, of visible, occluded, and back-facing points on a surface.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Techniques described herein may be performed for stroke-based rendering, a rendering technique that is well known in the art of computer graphics. In one type of stroke-based rendering, two-dimensional brush strokes are built from a three-dimensional model according to any of a variety of known methods, such as Meier's approach referenced above. In Meier's approach, three-dimensional particles are generated on surfaces in a scene, and, for each particle, a two-dimensional stroke is built based on the particle's attributes (e.g., position, orientation, color, and any other properties for defining the stroke). The particles may serve as anchor points for the strokes so that each stroke can be associated with a point in three-dimensional space.

As explained above, as part of the process of ordering the strokes, the renderer may need to determine whether two strokes that overlap are associated with portions of surfaces in which one occludes the other in the view. This condition may then be used by the renderer to constraint the order in which the corresponding strokes are drawn for an image or a particular frame of an animation. Embodiments of the invention include techniques for verifying the existence of an occlusion condition between overlapping strokes.

A stroke depicts a patch of surface, or surface patch, around an anchor point on an object in the scene. A surface patch can be defined as a portion of surface bounded by a simple closed curve. A surface patch S is said to be a surface view patch for a viewpoint E if and only if there exists a bijective mapping between the points of S in world space and the points of the projection of S onto the image plane. Consequently, a surface view patch is either entirely front-facing or entirely back-facing with respect to the viewpoint. In addition, the projection of a surface view patch onto the image plane is a two-dimensional surface patch in image space.

Because strokes are created in image space for a given view, each stroke naturally depicts a view patch of surface. Two overlapping strokes define an occlusion if they depict two different view patches, as illustrated in FIG. 2, but not if they depict the same view patch, as shown in FIG. 1. Embodiments of the invention thus verify whether two overlapping strokes together depict the same view patch of surface. In this way, a renderer can determine whether one of the overlapping strokes is occluding the other stroke. This in turn allows the renderer to determine whether to apply an occlusion constraint between the overlapping strokes.

Figure 3:
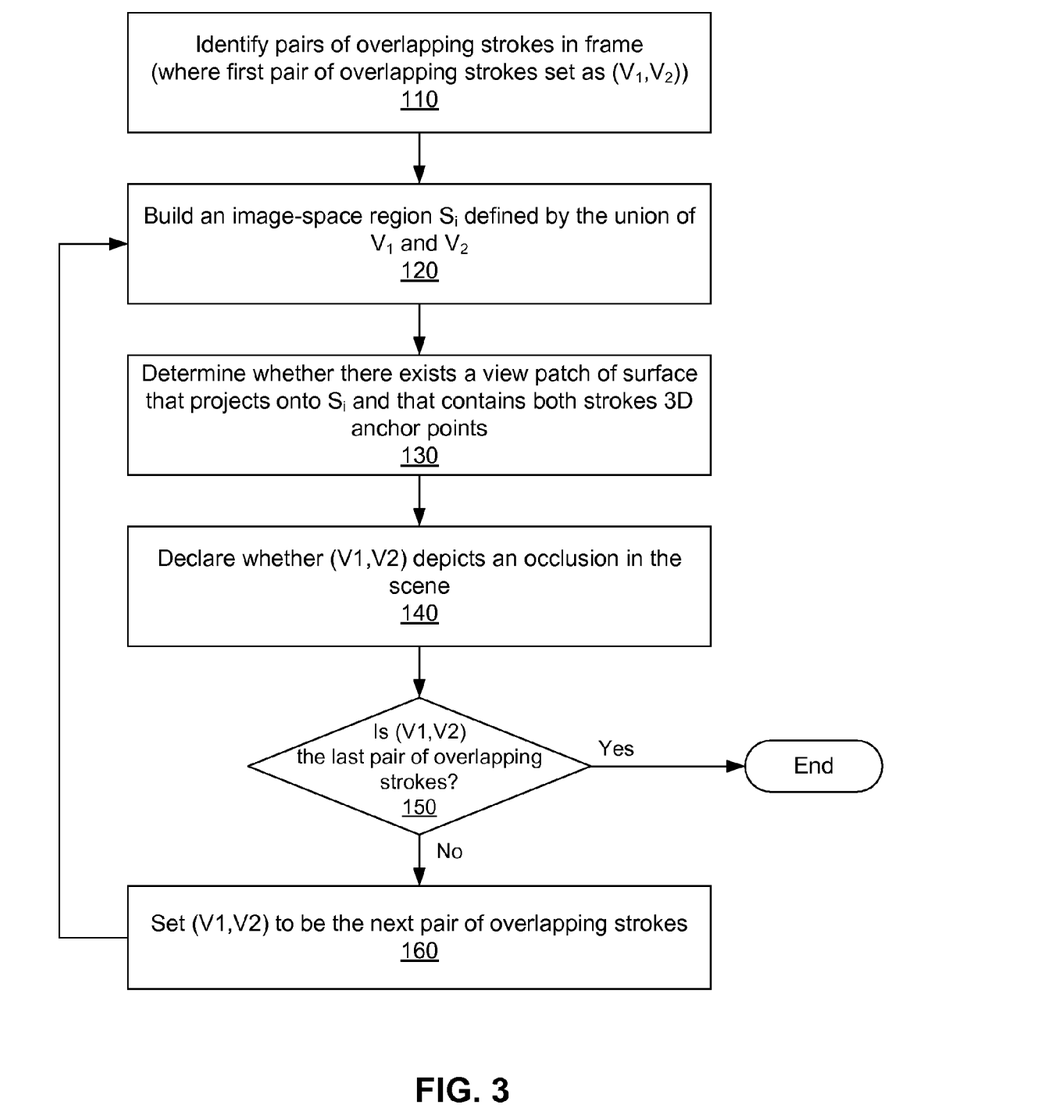
FIG. 3 is a flow chart of a method for identifying occlusions in the scene in the context of stroke-based rendering, in accordance with an embodiment of the invention.

FIG. 3 is a high-level description of an embodiment for determining whether overlapping strokes depict an occlusion. During the rendering of a stroke-based animation, a renderer would typically perform this process while rendering each frame each time the renderer needs to determine whether overlapping strokes define an occlusion and thus need to be drawn in a particular order. The renderer identifies 110 the pairs of overlapping strokes for which it needs to determine whether to apply an occlusion constraint therebetween. For each pair of overlapping strokes, the renderer then builds 120 an image space surface patch $S_i$ defined by the union of the two strokes. Relying on the fore-mentioned property stating that a surface view patch projects onto an image-space patch of surface, the renderer determines 130 whether there exists a surface view patch $S_w$ in the three-dimensional scene that both projects onto the image-space patch Si and contains the two strokes' three-dimensional anchor points. Based on this determination, the renderer can declare 140 whether the strokes together depict an occlusion (i.e., if there is no such view patch) or not. A more specific embodiment of this method is described below.

Building an Image-space Surface Patch from the Union of Two Strokes

In stroke-based rendering, strokes generally loosely describe three-dimensional surfaces. For instance, they often extend beyond the limit of the object they describe. As a result, a stroke does not necessarily strictly define a three-dimensional view patch, so it can be ill-posed or difficult to infer a three-dimensional view patch from a given stroke. To avoid these difficulties, in one embodiment, the renderer reduces the view patch described by a stroke to the infinitesimal surface patch around its anchor point.

In one embodiment, the image-space surface patch $S_i$ defined by the union of two strokes is an infinitesimal surface patch containing the projections of both strokes' three-dimensional anchor points, i.e. a path in image space: Given two strokes Vp and Vq with three-dimensional anchor points P and Q, the projection $S_i$ is built as a two-dimensional path between p and q, which are the projections of P and Q, respectively, onto the image plane. In one embodiment, the segment [pq] in the image plane is used as a first approximation for the two-dimensional path.

Computing Silhouette and Border Lines

Embodiments of the technique described herein build three-dimensional silhouette and border lines. These lines are organized as a set of three-dimensional segments of constant visibility (i.e., with the same quantitative invisibility at all points) using the approach described thereafter. The silhouette lines can be computed according to any silhouette detection algorithm.

In one embodiment, the renderer computes the polygonal approximation of the silhouette lines, as described for example in Northrup, J. D. and Markosian, L. 2000. Artistic silhouettes: a hybrid approach. In Proceedings of the 1st international Symposium on Non-Photorealistic Animation and Rendering (Annecy, France, Jun. 5-07, 2000). NPAR '00. ACM Press, New York, N.Y., 31-37. In another embodiment, the renderer computes a smoother approximation of the silhouette lines according to the algorithm described in Hertzmann, A. and Zorin, D. 2000. Illustrating smooth surfaces. In Proceedings of the 27th Annual Conference on Computer Graphics and interactive Techniques International Conference on Computer Graphics and Interactive Techniques. ACM Press/Addison-Wesley Publishing Co., New York, N.Y., 517-526). The polygonal approximation of the silhouette lines beneficially allows for more consistent visibility analysis.

The resulting silhouette lines are then projected onto the image plane and structured as a planar graph to which cusp vertices are added. Cusp vertices are described in more detail, for example, in Markosian, L., Kowalski, M. A., Goldstein, D., Trychin, S. J., Hughes, J. F., and Bourdev, L. D. 1997. Real-time nonphotorealistic rendering. In Proceedings of the 24th Annual Conference on Computer Graphics and interactive Techniques International Conference on Computer Graphics and Interactive Techniques. ACM Press/Addison-Wesley Publishing Co., New York, N.Y., 415-420. Any edge of that planar graph will have a constant visibility because a change in visibility can only happen at T-junctions or cusps, which are all vertices of the graph (see, e.g., Whitney. H. 1955. On Singularities of Mappings of Euclidean Spaces. I. Mappings of the Plane into the Plane. The Annals of Mathematics, 2nd Ser., Vol. 62, No. 3 (November, 1955), pp. 374-410). By inverse projecting the vertices of the graph onto the three-dimensional silhouettes, it is possible to cut the three dimensional lines to obtain silhouette segments of constant visibility.

The silhouette edges are oriented so as to have the front facing side of the surface always to their left. As a result, the orientation of the silhouettes in the image plane is such that the object is always on their left. This defines whether intersecting a given silhouette in the image plane means going behind or appearing from behind an object.

Verifying the Existence of a Surface View Patch Containing Both Strokes' Anchor Points and Projecting onto $S_i$ As described above, through a pair of overlapping strokes to test, the renderer is given two three-dimensional points P and Q, the strokes' three-dimensional anchor points, and a two-dimensional image space path $S_i$ between their respective projections p and q, built as explained above. The renderer then determines whether there exists a valid three-dimensional view patch that contains both P and Q and projects onto $S_i$. In one embodiment, the renderer makes this determination by, first, verifying whether there is a three-dimensional surface view patch containing P and projecting onto $S_i$ and, then, determining whether Q also belongs to this view patch.

In one embodiment, the algorithm uses the concept of quantitative invisibility, where the quantitative invisibility of a three dimensional point P in a scene is equal to the number of surfaces intersected by a ray joining P to the viewpoint. This concept is described, for example, in Appel, A. 1967. The notion of quantitative invisibility and the machine rendering of solids. In Proceedings of the 1967 22nd National Conference (Washington, D.C., United States). S. Rosenthal, Ed. ACM Press, New York, N.Y., 387-393. The renderer initializes the quantitative invisibility of a virtual path joining P and Q in world space and projecting onto $S_i$ in image space, to the quantitative invisibility of P. The quantitative invisibility of a stroke can be computed by tracing a ray from the viewpoint to its corresponding anchor point and counting the number of intersected surfaces. The quantitative invisibility of the virtual path is then updated (i.e., increased or decreased) each time a silhouette is crossed as the renderer moves along the path's image-space counterpart, $S_i$, joining p and q. This three-dimensional virtual path acts as a candidate for the view patch whose existence is tested.

Eventually, if the computed quantitative invisibility obtained at the end of the path is the same as the quantitative invisibility of Q, the virtual path in world space follows a three-dimensional view patch containing both P and Q. This would mean that the two strokes Vp and Vq together depict a single view patch and do not define an occlusion. Otherwise, the strokes together depict different view patches and thus do define an occlusion. In such a case, the renderer would typically need to enforce a depth order between the occluding strokes.

This algorithm uses the property that the evolution of the quantitative invisibility along a given material line can be determined by analyzing its intersections with silhouettes in the image plane. Each intersection with a silhouette means that the material line is either passing behind a surface or appearing from behind a surface. Differentiating between these two cases is possible since the silhouette lines can be oriented to consistently have the surface they are enclosing either at their right or at their left in image space. Additionally, if as the renderer moves along the line in image space it reaches the boundary of the view patch containing P, the renderer can conclude that no view patch containing P projects exactly onto Si.

In the following, the notation qi(P) is used to designate the quantitative invisibility of a three-dimensional point P. $V_p$ and $V_q$ are the two overlapping strokes for which the renderer is verifying the existence of an occlusion condition, and P and Q are their respective three-dimensional anchor points with projections p and q in the image plane, as shown in the examples of FIGS. 1 and 2.

The following algorithm, "SinglePatch," receives as inputs the three-dimensional anchor points P and Q, the image-space path $S_i$ between their projections p and q, and the set C of silhouette segments $C_i$ in image space, defined above.

```
SinglePatch(P,Q,p,q,C):
1    compute the set ∩pq of intersections ∩i between
     the path Si and the silhouettes Ci in image space.
2    sort ∩pq with respect to the distance |∩i-p|
3    qi←qi(P)
4    for each intersection ∩i
5        UPDATEQI(P,Q,Ci,qi)
```

-continued

```
    6      if qi =∞
    7          return 0
    8      if qi = qi (Q)
    9          return 1
   10   return 0
```

The algorithm returns 1 when the tuple $(P,Q,S_t)$ defines a three-dimensional view patch, in which case $V_p$ and $V_q$ do not define an occlusion. The variable qi initialized at line 3 corresponds to the quantitative invisibility of the virtual three-dimensional path between P and Q, i.e. the candidate view patch, at instant t. It is updated as the algorithm moves along the path $S_t$. The call to "UpdateQi" (in line 5) determines if the candidate view patch is passing behind the intersected object or appearing from behind it, and either increases or decreases the current quantitative invisibility qi.

Figure 4:
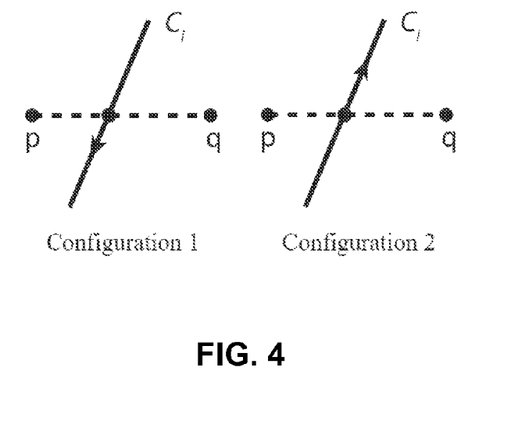
FIG. 4 illustrates the two possible configurations for a directed silhouette segment intersecting in image space the segment joining the projections of two overlapping strokes' anchor points, in accordance with an embodiment of the invention.
Figure 5:
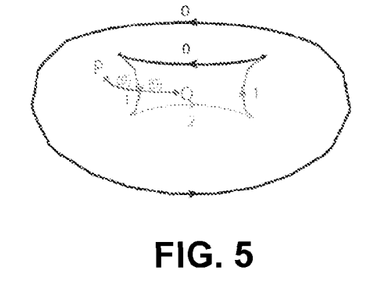
FIGS. 5 to 12 illustrate different configurations of a candidate view patch intersecting, in image space, a silhouette segment on a torus.

Depending on the configuration of the directed silhouette segment with respect to the path $S_t$, qi is updated differently. Two possible configurations of the path $S_t$, which goes from p to q, with respect to the silhouette Ci are illustrated in FIG. 4. Configuration 1 and configuration 2 correspond to the case where $\det|\vec{pq} \times \vec{C_i}| < 0$ and $\det|\vec{pq} \times \vec{C_i}| > 0$, respectively. The following algorithm, "UpdateQi," may be used for determining the configuration in which the path and the silhouette are.

$UpdateQi(P, Q, C_i, qi)$:

```
    1      if det|pq⃗ × C⃗ᵢ| < 0
    2         UPDATEQI1(P, Q, CI, QI)
    3      else
    4         UPDATEQI2(P, Q, CI, QI)
```

The first configuration corresponds to a case where the candidate view patch is potentially passing behind an object, whereas the second configuration corresponds to a case where it is potentially appearing from behind an object. These conditions are only potential because, in both cases, if the quantitative invisibility of the silhouette is higher than that of the candidate view patch, it cannot affect the last one. Both update algorithms thus ignore such silhouettes.

The following algorithms, "UpdateQi1" and "UpdateQi2," can be used for updating the quantitative invisibility after an intersection with a silhouette—UpdateQi1 in the first configuration, and UpdateQi2 in the second one.

```
UpdateQi1(P,Q,Cᵢ,qi):
    1    if qi < qi(Cᵢ)
    2       return
    3    else
    4       qi = qi + 2
UpdateQi2(P,Q,Cᵢ,qi):
    1    if qi < qi(Cᵢ)
    2       return
    3    if qi = qi(Ci) or qi= qi(Ci) + 1
    4       qi = ∞
    5    else
    6       qi = qi−2
```

These algorithms are described in the following with reference to FIGS. 5 through 12, which show the silhouette of a torus with various valid or non valid view patch candidates. In each of these illustrations, the silhouettes are drawn in gray levels, lighter and thinner as the quantitative invisibility is higher. The quantitative invisibility of each silhouette or view patch candidate segment is indicated next to the lines.

With respect to the "UpdateQi1" algorithm, which applies in the first configuration, shown in the leftmost illustration of FIG. 4, if the line being intersected has a higher quantitative invisibility than the current qi, it is behind the candidate view patch and thus cannot affect the determination. In that case, illustrated in FIG. 5, the renderer simply returns (i.e., the quantitative invisibility of the candidate view patch is left unchanged). Assuming that all objects in the scene are 2-manifold surfaces, depending on the parity of qi, the renderer knows whether the candidate view patch is on a front-facing or on a back-facing surface—even for front-facing and odd for back-facing.

Figure 6:
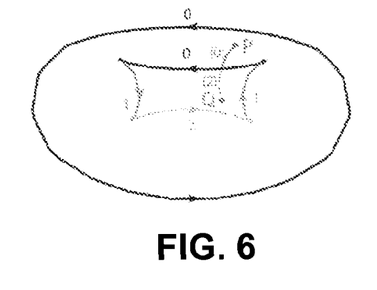
Figure 7:
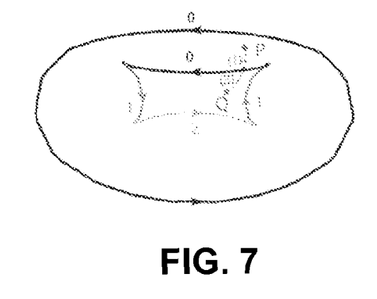
Figure 8:
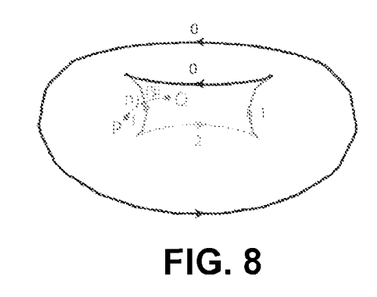

If on a front-facing surface and if qi(Ci) is equal to or smaller than qi, the configuration can only mean that the candidate view patch is passing behind an object; therefore, qi must be increased by 2. This configuration is shown in FIG. 6. If qi is odd (i.e., indicating a back-facing surface) and if qi(Ci) is equal to or smaller than qi, the candidate view patch is also passing behind a surface, as shown in FIG. 7. In that situation, if the quantitative invisibility of the intersected silhouette is different than qi (i.e., strictly less than qi), then the candidate view patch is, like previously, passing behind a front-more object; therefore, qi must be increased by two. If that silhouette has the same quantitative invisibility as qi, it is a fold emanating from a cusp point, as illustrated in FIG. 8, and qi would again be increased by 2.

Figure 9:
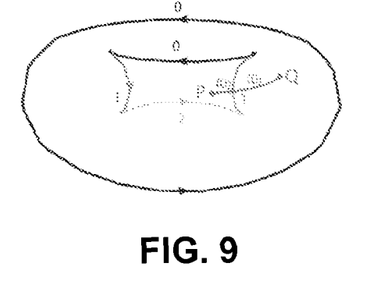
Figure 10:
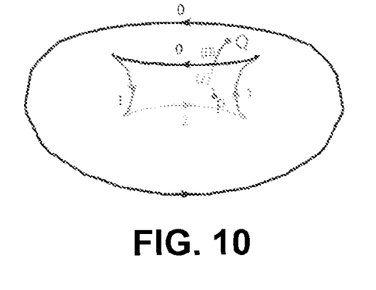
Figure 11:
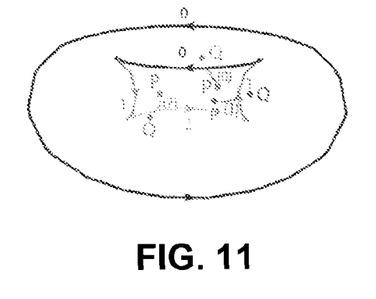
Figure 12:
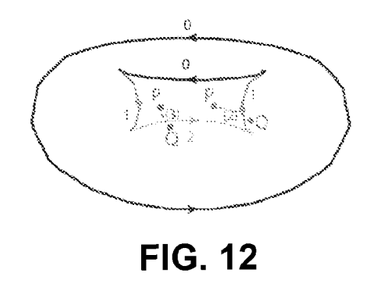

Within respect to the "UpdateQi2" algorithm, which applies in the second configuration, shown in the rightmost illustration of FIG. 4, as with the previous algorithm, line 1 just discards intersections that cannot have any effect on qi, as shown in FIG. 9. In the general case, configuration 2 indicates that the path is appearing from behind a surface, in which case qi is simply decreased by 2. This is done at line 9 in the algorithm and is illustrated in FIG. 10. However, there are some exceptions to this step. First, if the intersected silhouette has a quantitative invisibility equal to qi, it is the boundary of the view patch that the algorithm is following. Several cases where this may occur are shown in FIG. 11. When this situation is encountered, the renderer can directly conclude that the two strokes do not together depict a single view patch. Similarly, if the silhouette's quantitative invisibility is equal to qi−1, this silhouette line is connected to a cusp point and is also a boundary for the view patch followed by the virtual line, as shown in FIG. 12. Lines 3 and 4 of the algorithm handle these two cases, wherein qi is set to infinite so that algorithm SinglePatch can stop (e.g., in lines 6 and 7).

Using the algorithms and descriptions described above, the renderer can determine whether the two strokes together depict a single view patch. As explained, this information can be used by the renderer to decide whether the three-dimensional scene being rendering imposes an occlusion constraint between the strokes by virtue of the strokes' belonging to different surfaces in the frame, where one surface at least partially blocks the other from the viewpoint of the renderer.

Generalized Contours

Figure 13:
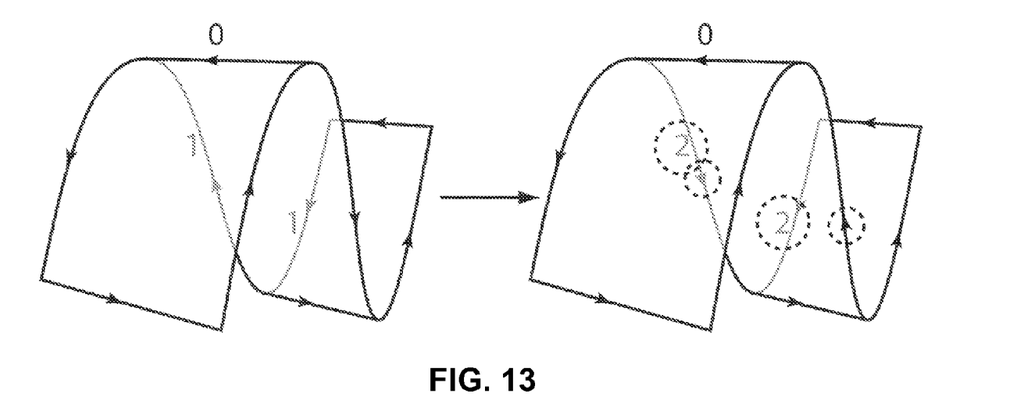
FIG. 13 illustrates the changes that are made to the computation of the quantative invisibility and the orientation of the border lines for open surfaces to be transparently handled, in accordance with one embodiment of the invention.

The techniques described above can be generalized to work with both silhouette and border edges. In one embodiment, it is possible to assimilate open surfaces to infinitely thin 2-manifolds with embodiments of the algorithms described above with two additional steps. The first step stems from the observation that border lines, as opposed to silhouette lines, do not have a consistent orientation in the view. Therefore, the renderer post-processes the border edges to guarantee that the surface will lie on their left in the view, as for silhouette edges. This can be performed by reversing the direction of all border edges belonging to back-facing triangles. The second additional step is to increase or decrease the quantitative invisibility by two when a border is intersected, thereby simulating the infinitely thin manifold surface. Both these changes are illustrated in FIG. 13.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system or similar electronic computing device, which manipulates and transforms data represented as physical (electronic) quantities within the computer system memories or registers or other such information storage, transmission, or display devices.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded in a carrier wave transmitted according to any suitable transmission method.

Embodiments of the invention may also relate to an animation product that comprises a machine-readable medium, where the machine-readable medium contains media data that is operable to cause a video machine to produce a video stream for playback on a video display. The media data stored on the machine-readable medium are produced using embodiments of the methods and processes described herein. The animation product may thus comprise any type of medium with the appropriate media data stored thereon that can be played on a video machine. Examples include DVDs that can be played on DVD players, storage devices that can provide media for playback on a computing device (including computers, cellular phones, and any other computing device capable of playing video), film onto which video images are placed for display using a projector system, and any other product suitable for display of the media data thereon in conjunction with a video machine for playing back the corresponding video stream.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

Finally, it should be noted that the language used in the specification has been principally selected for readability and instructional purposes, and it may not have been selected to delineate or circumscribe the inventive subject matter. Accordingly, the disclosure of the embodiments of the invention is intended to be illustrative, but not limiting, of the scope of the invention, which is set forth in the following claims.

What is claimed is:

1. A method for determining whether two overlapping strokes in stroke-based rendering depict an occlusion, the method comprising:

identifying, by a computer processor, two overlapping strokes created for a stroke-based rendering, each stroke including an anchor point in a three-dimensional scene;

determining, by a computer processor, whether the two strokes together depict a single view patch of surface under the rendering viewpoint; and declaring, by a computer processor, the two strokes to depict an occlusion in the scene if the two strokes do not together depict a single view patch.

2. The method of claim 1, wherein the determining comprises:

building an image-space patch of surface from the union of the two overlapping strokes; and determining whether there exists a surface view patch in the three-dimensional scene that projects onto the built image-space patch of surface and that contains both strokes' three-dimensional anchor points.

3. The method of claim 2, wherein the determining comprises:
   determining whether there is a surface view patch containing one of the strokes' anchor points and projecting onto the image-space patch of surface; and
   determining whether the other of the two strokes' anchor points belongs to the identified surface view patch.

4. The method of claim 2, wherein the image-space patch of surface is a path in the image plane between the projected anchor points for the strokes.

5. The method of claim 1, further comprising:
   responsive to declaring the two strokes to depict an occlusion in the scene, applying an occlusion constraint to enforce the order in which the strokes are drawn in the frame.

6. The method of claim 1, further comprising:
   declaring the two strokes not to depict an occlusion in the scene if the two strokes together do not depict a single view patch.

7. The method of claim 1, the overlapping strokes including a first stroke and a second stroke, wherein the determining comprises:
   building a set of three-dimensional silhouette segments in the scene, each silhouette segment having the same quantitative invisibility at all points;
   computing the quantitative invisibility of the first stroke's three-dimensional anchor point;
   defining a candidate view patch as a virtual path on a three-dimensional surface of the scene, starting at the first stroke's anchor point and projecting onto the image-space path joining the projections of the overlapping strokes' anchor points;
   determining the quantitative invisibility of the virtual path at an ending extremity thereof, which has the same projection as the second stroke's anchor point, by initializing the quantitative invisibility at a beginning extremity to the first stroke's anchor point and by updating it each time a silhouette segment is crossed in image space;
   computing the quantitative invisibility of the second stroke's three-dimensional anchor point; and
   determining whether the two strokes together depict a single view patch by comparing the quantitative invisibility of the virtual path computed at the end extremity with the quantitative invisibility of the second stroke.

8. A method for stroke-based rendering, the method comprising:
   drawing strokes to depict objects in a three-dimensional scene, each stroke including an anchor point in the scene;
   identifying a plurality of pairs of overlapping strokes in an image plane used for the rendering;
   for one or more of the identified pairs of overlapping strokes, determining whether the pair of strokes together depict a single surface view patch;
   identifying one or more pairs of overlapping strokes as depicting an occlusion in the scene based on the determining; and
   rendering the frame, by a computer processor, by ordering the strokes at least in part based on whether the overlapping strokes depict an occlusion in the scene.

9. The method of claim 8, wherein the determining comprises:
   building an image-space patch of surface from the union of the two overlapping strokes; and
   determining whether there exists a surface view patch in the three-dimensional scene that projects onto the built image-space patch of surface and that contains both strokes' three-dimensional anchor points.

10. The method of claim 9, wherein the determining further comprises:
    determining whether there is a surface view patch containing one of the strokes and projecting onto the image-space patch of surface; and
    determining whether the other of the two strokes belongs to the identified surface view patch.

11. The method of claim 9, wherein the image-space patch of surface is a path in the image plane between the projected anchor points for the strokes.

12. The method of claim 8, wherein the rendering comprises, applying an occlusion constraint to enforce the order in which one or more pairs of strokes is drawn in the frame relative to each other if the pairs are identified as depicting an occlusion in the scene.

13. The method of claim 8, wherein a particular pair of overlapping strokes is identified as depicting an occlusion in the scene if the pair of strokes together is determined to depict a single surface view patch.

14. The method of claim 8, wherein a particular pair of overlapping strokes is identified as not depicting an occlusion in the scene if the pair of strokes together is determined no to depict a single surface view patch.

15. The method of claim 8, each pair of overlapping strokes including a first stroke and a second stroke, wherein the determining comprises:
    building a set of three-dimensional silhouette segments in the scene, each silhouette segment having the same quantitative invisibility at all points;
    computing the quantitative invisibility of the first stroke's three-dimensional anchor point;
    defining a candidate view patch as a virtual path on a three-dimensional surface of the scene, starting at the first stroke's anchor point and projecting onto the image-space path joining the projections of the overlapping strokes' anchor points;
    determining the quantitative invisibility of the virtual path at an ending extremity thereof, which has the same projection as the second stroke's anchor point, by initializing the quantitative invisibility at a beginning extremity to the first stroke's anchor point and by updating it each time a silhouette segment is crossed in image space;
    computing the quantitative invisibility of the second stroke's three-dimensional anchor point; and
    determining whether the two strokes together depict a single view patch by comparing the quantitative invisibility of the virtual path computed at the end extremity with the quantitative invisibility of the second stroke.

16. A computer program product for determining whether two overlapping strokes in stroke-based rendering depict an occlusion, the computer program product comprising a non-transitory computer-readable storage medium containing computer program code for performing the method comprising:
    identifying two overlapping strokes created for a stroke-based rendering, each stroke including an anchor point in a three-dimensional scene;
    determining whether the two strokes together depict a single view patch of surface under the rendering viewpoint; and
    declaring the two strokes to depict an occlusion in the scene if the two strokes do not together depict a single view patch.

17. The computer program product of claim 16, wherein the determining comprises:
    building an image-space patch of surface from the union of the two overlapping strokes; and
    determining whether there exists a surface view patch in the three-dimensional scene that projects onto the built image-space patch of surface and that contains both strokes' three-dimensional anchor points.

18. The computer program product of claim 17, wherein the determining comprises:
determining whether there is a surface view patch containing one of the strokes' anchor points and projecting onto the image-space patch of surface; and
determining whether the other of the two strokes' anchor points belongs to the identified surface view patch.

19. The computer program product of claim 17, wherein the image-space patch of surface is a path in the image plane between the projected anchor points for the strokes.

20. The computer program product of claim 16, wherein the method further comprises:
responsive to declaring the two strokes to depict an occlusion in the scene, applying an occlusion constraint to enforce the order in which the strokes are drawn in the frame.

21. The computer program product of claim 16, further comprising:
declaring the two strokes not to depict an occlusion in the scene if the two strokes together do not depict a single view patch.

22. The computer program product of claim 16, the overlapping strokes including a first stroke and a second stroke, wherein the determining comprises:
building a set of three-dimensional silhouette segments in the scene, each silhouette segment having the same quantitative invisibility at all points;
computing the quantitative invisibility of the first stroke's three-dimensional anchor point;
defining a candidate view patch as a virtual path on a three-dimensional surface of the scene, starting at the first stroke's anchor point and projecting onto the image-space path joining the projections of the overlapping strokes' anchor points;
determining the quantitative invisibility of the virtual path at an ending extremity thereof, which has the same projection as the second stroke's anchor point, by initializing the quantitative invisibility at a beginning extremity to the first stroke's anchor point and by updating it each time a silhouette segment is crossed in image space;
computing the quantitative invisibility of the second stroke's three-dimensional anchor point; and
determining whether the two strokes together depict a single view patch by comparing the quantitative invisibility of the virtual path computed at the end extremity with the quantitative invisibility of the second stroke.

23. A computer program product for stroke-based rendering, the computer program product comprising a non-transitory computer-readable storage medium containing computer program code for performing the method comprising:
drawing strokes to depict objects in a three-dimensional scene, each stroke including an anchor point in the scene;
identifying a plurality of pairs of overlapping strokes in an image plane used for the rendering;
for one or more of the identified pairs of overlapping strokes, determining whether the pair of strokes together depict a single surface view patch;
identifying one or more pairs of overlapping strokes as depicting an occlusion in the scene based on the determining; and
rendering the frame by ordering the strokes at least in part based on whether the overlapping strokes depict an occlusion in the scene.

24. The computer program product of claim 23, wherein the determining comprises:
building an image-space patch of surface from the union of the two overlapping strokes; and
determining whether there exists a surface view patch in the three-dimensional scene that projects onto the built image-space patch of surface and that contains both strokes' three-dimensional anchor points.

25. The computer program product of claim 24, wherein the determining further comprises:
determining whether there is a surface view patch containing one of the strokes and projecting onto the image-space patch of surface; and
determining whether the other of the two strokes belongs to the identified surface view patch.

26. The computer program product of claim 24, wherein the image-space patch of surface is a path in the image plane between the projected anchor points for the strokes.

27. The computer program product of claim 23, wherein the rendering comprises, applying an occlusion constraint to enforce the order in which one or more pairs of strokes is drawn in the frame relative to each other if the pairs are identified as depicting an occlusion in the scene.

28. The computer program product of claim 23, wherein a particular pair of overlapping strokes is identified as depicting an occlusion in the scene if the pair of strokes together is determined to depict a single surface view patch.

29. The computer program product of claim 23, wherein a particular pair of overlapping strokes is identified as not depicting an occlusion in the scene if the pair of strokes together is determined no to depict a single surface view patch.

30. The computer program product of claim 23, each pair of overlapping strokes including a first stroke and a second stroke, wherein the determining comprises:
building a set of three-dimensional silhouette segments in the scene, each silhouette segment having the same quantitative invisibility at all points;
computing the quantitative invisibility of the first stroke's three-dimensional anchor point;
defining a candidate view patch as a virtual path on a three-dimensional surface of the scene, starting at the first stroke's anchor point and projecting onto the image-space path joining the projections of the overlapping strokes' anchor points;
determining the quantitative invisibility of the virtual path at an ending extremity thereof, which has the same projection as the second stroke's anchor point, by initializing the quantitative invisibility at a beginning extremity to the first stroke's anchor point and by updating it each time a silhouette segment is crossed in image space;
computing the quantitative invisibility of the second stroke's three-dimensional anchor point; and
determining whether the two strokes together depict a single view patch by comparing the quantitative invisibility of the virtual path computed at the end extremity with the quantitative invisibility of the second stroke.

31. An animation product comprising a non-transitory machine-readable storage medium, the machine-readable medium containing media data operable to cause a video machine to produce a video stream for playback on a video display, the media data generated according to a process that comprises any one of the claimed method of the claims 1-15.

* * * * *

UNITED STATES PATENT AND TRADEMARK OFFICE
CERTIFICATE OF CORRECTION

PATENT NO. : 7,746,344 B2
APPLICATION NO. : 11/668449
DATED : June 29, 2010
INVENTOR(S) : Stephane Grabli et al.

Page 1 of 1

It is certified that error appears in the above-identified patent and that said Letters Patent is hereby corrected as shown below:

Column 12, line 22, Claim 14, after "determined" please change "no to" to "not to"; and
Column 14, line 31, Claim 29, after "determined" please change "no to" to "not to".

Signed and Sealed this

Second Day of November, 2010

David J. Kappos
*Director of the United States Patent and Trademark Office*